United States Patent
Zhu

(10) Patent No.: US 12,282,659 B2
(45) Date of Patent: Apr. 22, 2025

(54) DATA MANAGEMENT APPARATUS, DATA MANAGEMENT METHOD, AND DATA STORAGE DEVICE

(71) Applicant: HUAWEI TECHNOLOGIES CO., LTD., Shenzhen (CN)

(72) Inventor: Xiaoming Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 17/959,861

(22) Filed: Oct. 4, 2022

(65) Prior Publication Data
US 2023/0028301 A1    Jan. 26, 2023

Related U.S. Application Data

(63) Continuation of application No. PCT/CN2021/081210, filed on Mar. 17, 2021.

(30) Foreign Application Priority Data

Apr. 8, 2020  (CN) .......................... 202010271256.1
Jul. 23, 2020  (CN) .......................... 202010718684.4

(51) Int. Cl.
    G06F 3/06    (2006.01)
(52) U.S. Cl.
    CPC .......... *G06F 3/0613* (2013.01); *G06F 3/0647* (2013.01); *G06F 3/0673* (2013.01)
(58) Field of Classification Search
    None
    See application file for complete search history.

(56) References Cited

U.S. PATENT DOCUMENTS

| | | | | |
|---|---|---|---|---|
| 6,976,134 B1 * | 12/2005 | Lolayekar | ............. | H04L 67/101 710/316 |
| 7,305,520 B2 * | 12/2007 | Voigt | .................... | G06F 3/0635 711/112 |

(Continued)

FOREIGN PATENT DOCUMENTS

| CN | 101398745 A | 4/2009 |
|---|---|---|
| CN | 106484325 A | 3/2017 |

(Continued)

OTHER PUBLICATIONS

Rob Elliott, "SAS-2 Multiplexing (Draft) Revison 7," XP093145552, 05-381r7 SAS-2 Multiplexing, Total 101 pages (Nov. 6, 2006).

*Primary Examiner* — Kevin Verbrugge
(74) *Attorney, Agent, or Firm* — Leydig, Voit & Mayer, Ltd.

(57) ABSTRACT

A data management apparatus, a data management method, and a data storage device are provided. The data management apparatus includes a management unit and a data migration unit. The management unit manages data transmission channels between two types of storage media with different transmission performance. Then, the data migration unit migrates data between the two types of storage media through the managed data transmission channels. In this way, the data management apparatus can directly migrate data between storage media with different transmission performance, and a CPU in a system does not need to perform processing such as instruction conversion and protocol conversion, so that a delay of performing the foregoing processing by the CPU can be shortened. In addition, because the CPU does not need to perform data migration, resource overheads of the CPU can be reduced.

20 Claims, 8 Drawing Sheets

(56) References Cited

U.S. PATENT DOCUMENTS

| | | | |
|---|---|---|---|
| 7,539,824 B2* | 5/2009 | Lolayekar | H04L 67/1014 |
| | | | 710/316 |
| 9,063,841 B1* | 6/2015 | Valency | G06F 12/023 |
| 11,099,763 B1* | 8/2021 | Vossberg | G06F 3/0607 |
| 2003/0079018 A1* | 4/2003 | Lolayekar | G06F 3/067 |
| | | | 709/239 |
| 2005/0172073 A1* | 8/2005 | Voigt | G06F 3/0635 |
| | | | 711/114 |
| 2005/0172097 A1* | 8/2005 | Voigt | G06F 3/067 |
| | | | 711/170 |
| 2006/0075191 A1* | 4/2006 | Lolayekar | G06F 3/067 |
| | | | 711/114 |
| 2006/0112219 A1* | 5/2006 | Chawla | G06F 3/0658 |
| | | | 711/115 |
| 2008/0114924 A1 | 5/2008 | Frayer et al. | |
| 2010/0199036 A1 | 8/2010 | Siewert et al. | |
| 2015/0193309 A1* | 7/2015 | Khadiwala | G06F 11/3485 |
| | | | 714/4.11 |
| 2016/0284040 A1* | 9/2016 | Rengarajan | G06F 3/06 |
| 2018/0336101 A1* | 11/2018 | Resch | G06F 11/0727 |
| 2020/0393984 A1* | 12/2020 | Basu | G06F 3/0632 |
| 2022/0276804 A1* | 9/2022 | Otsuka | G06F 3/0679 |

FOREIGN PATENT DOCUMENTS

| | | | | |
|---|---|---|---|---|
| CN | 109359069 A | 2/2019 | | |
| EP | 2963554 A1 | 1/2016 | | |
| WO | WO-03067445 A1 * | 8/2003 | | G06F 13/1684 |

\* cited by examiner

DATA MANAGEMENT APPARATUS, DATA MANAGEMENT METHOD, AND DATA STORAGE DEVICE

CROSS-REFERENCE TO RELATED APPLICATIONS

This application is a continuation of International Application No. PCT/CN2021/081210, filed on Mar. 17, 2021, which claims priority to Chinese Patent Application No. 202010271256.1, filed on Apr. 8, 2020 and Chinese Patent Application No. 202010718684.4, filed on Jul. 23, 2020. All of the aforementioned patent applications are hereby incorporated by reference in their entireties.

TECHNICAL FIELD

This application relates to the field of storage technologies, and in particular, to a data management apparatus, a data management method, and a data storage device.

BACKGROUND

Designing a hierarchical storage system is a trend of resolving a data storage problem, and a main idea thereof is: setting storage media with different performance in a storage system, and ensuring optimal performance of the storage system by utilizing advantages of the storage media with different performance. For example, the hierarchical storage system may include a first-type storage medium with a small storage capacity but a high read and write speed, and a second-type storage medium with a large storage capacity but a low read and write speed. In this way, the second-type storage medium may provide a large storage capacity, and the first-type storage medium may provide a relatively high read and write speed, thereby improving overall performance of the hierarchical storage system.

For example, in the hierarchical storage system, independent data flows, control flows, and interface protocols are usually set for different storage media. In this way, a central processing unit (central processing unit, CPU) of the hierarchical storage system can quickly access different storage media.

However, a data migration scenario exists in the hierarchical storage system. For example, if data that needs to be used by the CPU is stored in the second-type storage medium, the data can be used by the CPU only after being migrated from the second-type storage medium to the first-type storage medium. Independent data flows, control flows, and interface protocols are set for different storage media. Therefore, when data migration needs to be performed, the CPU needs to perform processing such as decoding, protocol conversion, and encoding on the data, resulting in a relatively high data migration delay. The foregoing processing process further needs to occupy cache and computing resources of the CPU, resulting in relatively high resource overheads. Therefore, how to shorten a delay and reduce resource overheads in a data migration process is an urgent technical problem to be resolved currently.

SUMMARY

Embodiments of this application provide a data management apparatus and method, and a data storage device, to shorten a delay of data migration between different storage media in a hierarchical storage system.

According to a first aspect, a data management apparatus is provided. The data management apparatus includes a management unit and a data migration unit. The management unit manages data transmission channels between two different types of storage media, for example, manages data transmission channels between at least two first storage media and a second storage medium. Transmission performance of the first storage medium is poorer than transmission performance of the second storage medium, and there is one data transmission channel between each first storage medium and the second storage medium. Then, the data migration unit migrates data between the second storage medium and the at least two first storage media through the data transmission channels managed by the management unit.

In the foregoing technical solution, the data management apparatus can directly migrate data between storage media with different transmission performance, and a CPU in a system does not need to perform processing such as instruction conversion and protocol conversion, so that a delay of performing the foregoing processing by the CPU can be shortened. In addition, because the CPU does not need to perform data migration, resource overheads of the CPU can be reduced.

In a possible design, transmission performance of the data transmission channel managed by the management unit matches the transmission performance of the second storage medium. In this way, a delay of data migration between the at least two first storage media and the second storage medium can be minimized. The transmission performance of the second storage medium may be a throughput, a data processing capability, or the like of the second storage medium. That transmission performance of the data transmission channel matches the transmission performance of the second storage medium means that the transmission performance of the data transmission channel matches the transmission performance of the second storage medium, and does not become a bottleneck of the transmission performance of the second storage medium.

In a possible design, the management unit may determine a quantity N of first storage media based on a first ratio of a transmission bit width of the second storage medium to a transmission bit width of the first storage medium or based on a second ratio of a transmission bandwidth of the second storage medium to a transmission bandwidth of the first storage medium. N is an integer not less than 2. Then, the management unit establishes data transmission channels between the N first storage media and the second storage medium based on the quantity N of first storage media.

In the foregoing technical solution, the management unit may manage a data transmission channel between different storage media in a plurality of manners, so that flexibility of the data management apparatus can be improved.

In a possible design, the data management apparatus further includes a data processing unit. The data processing unit receives a data read instruction, and reads target data from the second storage medium according to the data read instruction.

In the foregoing technical solution, a data processing unit may be disposed in the data management apparatus, so that the data management apparatus can communicate with another module. The another module may be a CPU or the like in a storage system.

In a possible design, if the target data corresponding to the data read instruction received by the data processing unit is stored in the at least two first storage media, the data migration unit is further configured to migrate the target data from the at least two first storage media to the second storage medium.

In the foregoing technical solution, the data processing unit may separately read data from different storage media. In this way, another module can use only one protocol to read data from different storage media, thereby simplifying a communications protocol between the data management apparatus and the another module.

In a possible design, the data management apparatus further includes a data processing unit, configured to: receive a first data write instruction, and write first data into the at least two first storage media according to the first data write instruction.

In a possible design, the data processing unit is further configured to: receive a second data write instruction, and write second data into the second storage medium according to the second data write instruction.

In the foregoing technical solution, the data management apparatus can not only read data from different storage media through the data processing unit, but also can write data into the storage media through the data processing unit. The data processing unit configured to read data and the data processing unit configured to write data may be a same data processing unit, or may be independent data processing units. This is not limited herein.

In a possible design, a same protocol is used for the first data write instruction and the second data write instruction. In this way, another module can use only one protocol to access different storage media, thereby simplifying a communications protocol between the data management apparatus and the another module.

According to a second aspect, a data management method is provided. In the method, data transmission channels between at least two first storage media and a second storage medium are first managed. Transmission performance of the first storage medium is poorer than transmission performance of the second storage medium, and there is one data transmission channel between each first storage medium and the second storage medium. Then, data is migrated between the second storage medium and the at least two first storage media through the data transmission channels.

In a possible design, transmission performance of the data transmission channel matches the transmission performance of the second storage medium. The transmission performance of the second storage medium may be a throughput, a data processing capability, a transmission bit width, a transmission bandwidth, or the like of the second storage medium. That transmission performance of the data transmission channel matches the transmission performance of the second storage medium means that the transmission performance of the data transmission channel matches the transmission performance of the second storage medium, and does not become a bottleneck of the transmission performance of the second storage medium.

In a possible design, that data transmission channels between at least two first storage media and a second storage medium are managed includes:
    determining a quantity N of first storage media based on a first ratio of a transmission bit width of the second storage medium to a transmission bit width of the first storage medium or based on a second ratio of a transmission bandwidth of the second storage medium to a transmission bandwidth of the first storage medium, where N is an integer not less than 2; and
    establishing data transmission channels between the N first storage media and the second storage medium based on the quantity N of first storage media.

In a possible design, the method further includes:
receiving a data read instruction, and reading target data from the second storage medium according to the data read instruction.

In a possible design, the method further includes:
migrating the target data from the at least two first storage media to the second storage medium.

In a possible design, the method further includes:
receiving a first data write instruction, and writing first data into the at least two first storage media according to the first data write instruction.

In a possible design, the method further includes:
receiving a second data write instruction, and writing second data into the second storage medium according to the second data write instruction.

In a possible design, a same protocol is used for the first data write instruction and the second data write instruction.

According to a third aspect, a data storage device is provided, including a controller, at least two first storage media, and a second storage medium. The controller separately communicates with the at least two first storage media and the second storage medium. There is one data transmission channel between each first storage medium and the second storage medium. The controller is configured to implement the method in any one of the second aspect and the designs of the second aspect. The data storage device may be a memory or the like.

According to a fourth aspect, an embodiment of this application provides a computer-readable storage medium. The computer-readable storage medium stores a computer program. The computer program includes program instructions. When the program instructions are executed by a computer, the computer is enabled to perform the method performed by the data management apparatus in the first aspect.

According to a fifth aspect, an embodiment of this application provides a computer program product. The computer program product stores a computer program. The computer program includes program instructions. When the program instructions are executed by a computer, the computer is enabled to perform the method performed by the data management apparatus in the first aspect.

According to a sixth aspect, this application provides a chip system. The chip system includes a processor, and may further include a memory, configured to implement the method performed by the data management apparatus in the first aspect. The chip system may include a chip, or may include a chip and another discrete device.

According to a seventh aspect, an embodiment of this application provides a storage system. The storage system includes the data management apparatus in the first aspect or the third aspect.

For beneficial effects of the second aspect to the seventh aspect and the implementations thereof, refer to the descriptions of the beneficial effects of the first aspect and the implementations thereof.

DESCRIPTION OF EMBODIMENTS

To make objectives, technical solutions, and advantages of embodiments of this application clearer, the following describes the technical solutions in embodiments of this application in detail with reference to accompanying drawings of the specification and specific implementations.

In embodiments of this application, "a plurality of" means two or more. In view of this, in embodiments of this application, "a plurality of" may alternatively be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship between associated objects and indicates that three relationships may exist. For example, A and/or B may indicate the following cases: Only A exists, both A and B exist, and only B exists, where A and B may be singular or plural. In addition, unless otherwise specified, the character "/" usually indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

Figure 1:
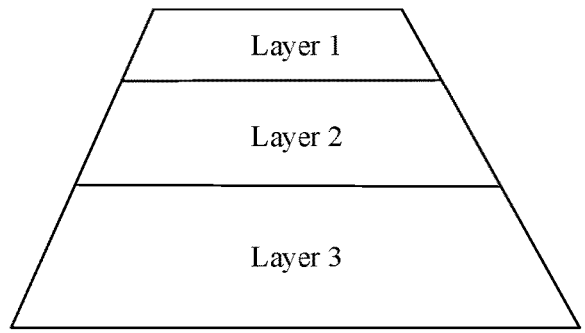
FIG. 1 is a schematic diagram of an example of a hierarchical system according to this application.

A method and an apparatus in embodiments of this application may be applied to a hierarchical system. FIG. 1 is a schematic diagram of an example of a hierarchical system. As shown in FIG. 1, storage media with different performance are located at different layers. For example, in FIG. 1, three layers are included, and are sequentially marked as a layer 1 to a layer 3 from top to bottom. A storage medium at the layer 3 is a hard disk, for example, may include a serial advanced technology attachment (serial advanced technology attachment, SATA) hard disk, a small computer system interface (small computer system interface, SCSI) hard disk, a serial attached SCSI (serial attached SCSI, SAS) hard disk, a fiber channel (fiber channel, FC) interface hard disk, a hard disk drive (hard disk drive, HDD), or a solid state drive (solid state drive, SSD). A storage medium at the layer 2 is a storage class memory (storage class memory, SCM), for example, may include a phase-change memory (phase-change memory, PCM), a resistive random-access memory (resistive random-access memory, ReRAM), or a magnetoresistive random-access memory (magnetoresistiverandom access memory, MRAM). A storage medium at the layer 1 is a dynamic random access memory (dynamic random access memory, DRAM), for example, may include a synchronous dynamic random-access memory (synchronous dynamic random-access memory, SDRAM), or a double data rate SDRAM (double data rate SDRAM, DDR SDRAM)).

From the layer 1 to the layer 3, storage capacities of the storage media are in descending order, but read and write speeds of the storage media are in ascending order. In this way, a lower-layer storage medium may provide a relatively large storage capacity, and an upper-layer storage medium may provide a relatively fast read and write speed, so that advantages of different media can be fully utilized, thereby improving performance of a storage system.

Figure 2:
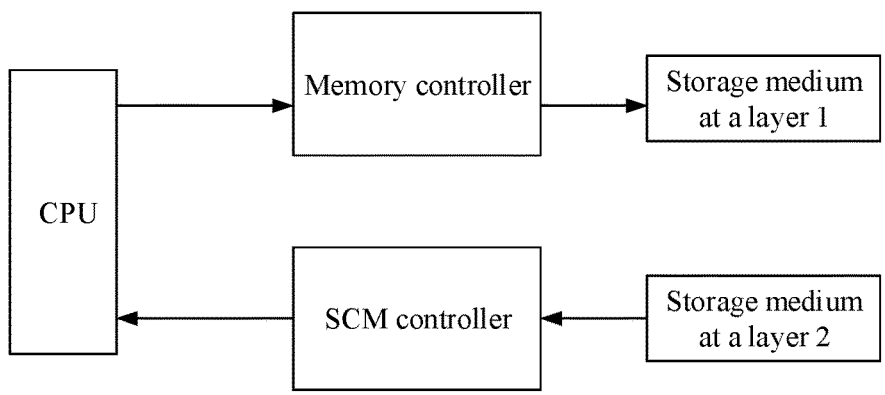
FIG. 2 is a schematic diagram of an example of data migration between different storage media in a hierarchical system.

In the hierarchical system shown in FIG. 1, a CPU in the system accesses storage media at different layers through different protocols and interfaces. For example, corresponding controllers may be set for storage media at different layers. The storage media at the layer 1 and the layer 2 in FIG. 1 are used as an example. Refer to FIG. 2. A memory controller (memory controller) may be set for the storage medium at the layer 1, and an SCM controller may be set for the storage medium at the layer 2. Therefore, when the CPU needs to access the storage medium at the layer 1, the CPU sends an instruction to the memory controller. When the CPU needs to access the storage medium at the layer 2, the CPU sends an instruction to the SCM controller. This achieves an objective of quickly accessing storage media at all layers.

However, a data migration scenario exists in the hierarchical system. For example, data stored in the storage medium at the layer 2 is migrated to the storage medium at the layer 1. Still refer to FIG. 2. When data migration needs to be performed, the SCM controller first reads the data from the storage medium at the layer 2, and then sends the read data to the CPU through a protocol and an interface that are used to communicate with the CPU. The CPU performs processing such as protocol conversion on received information, generates information used to communicate with the memory controller, and sends the information to the memory controller through an interface used to communicate with the memory controller. Finally, the memory controller performs processing such as decoding on the information to obtain the data, and stores the data in the storage medium at the layer 1.

It can be learned that, when data migration is performed, the CPU and storage medium controllers at different layers need to process the data, resulting in a relatively high data migration delay. In addition, the foregoing processing process needs to occupy cache and computing resources of the CPU, resulting in relatively high resource overheads. Therefore, how to shorten a delay and reduce resource overheads in a data migration process is an urgent technical problem to be resolved currently.

In view of this, this application provides a data management apparatus. The data management apparatus includes a management unit and a data migration unit. The management unit manages data transmission channels between two types of storage media with different transmission performance. Then, the data migration unit migrates data between the two types of storage media through the managed data transmission channels. In this way, the data management apparatus can directly migrate data between storage media with different transmission performance, and a CPU does not need to perform processing such as protocol conversion and data migration, so that a delay of performing the foregoing processing by the CPU can be shortened. In addition, because the CPU does not need to perform data migration, resource overheads of the CPU can be reduced.

The following describes the data management apparatus provided in this application with reference to the accompanying drawings.

It should be noted that the data management apparatus provided in this application may be applied to any system that includes storage media with different transmission performance, or the data management apparatus may be understood as a part of a system. The system may be the hierarchical system shown in FIG. 1, or may be another system. This is not limited herein. For ease of description, the following uses an example in which the data management apparatus is applied to the hierarchical system shown in FIG. 1. The system may be a server, a storage system, or the like. This is not limited in embodiments of the present invention.

Figure 3:
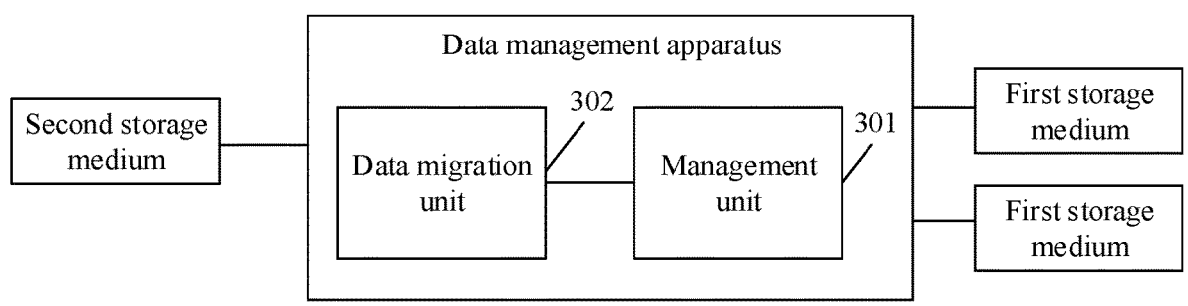
FIG. 3 is a block diagram of a structure of an example of a data management apparatus according to an embodiment of this application.

FIG. 3 is a block diagram of a structure of an example of a data management apparatus according to an embodiment of this application. As shown in FIG. 3, the data management apparatus includes a management unit 301 and a data migration unit 302. The data management apparatus may be configured to manage data in storage media with different transmission performance. For example, the storage media with different transmission performance include a first storage medium and a second storage medium. Transmission performance of the first storage medium is poorer than transmission performance of the second storage medium. The data management apparatus may be separately connected to at least two first storage media and a second storage medium. There is one data transmission channel between each first storage medium and the second storage medium. The management unit 301 is configured to manage data transmission channels between the at least two first storage media and the second storage medium. The data migration unit 302 migrates data between the second storage medium and the at least two first storage media through the data transmission channels managed by the management unit 301.

That the management unit 301 manages data transmission channels between the first storage media and the second storage medium may be understood as that the management unit 301 determines a plurality of data transmission channels for data transmission between the first storage media and the second storage medium. In embodiments of the present invention, the plurality of data transmission channels that are determined by the management unit 301 for data transmission between the first storage media and the second storage medium are referred to as virtual transmission channels. Because the transmission performance of the first storage medium is poorer than the transmission performance of the second storage medium, data transmission is performed between the second storage medium and the plurality of first storage media in parallel through the plurality of data transmission channels, so that the transmission performance of the first storage medium is less different from the transmission performance of the second storage medium.

Figure 4:
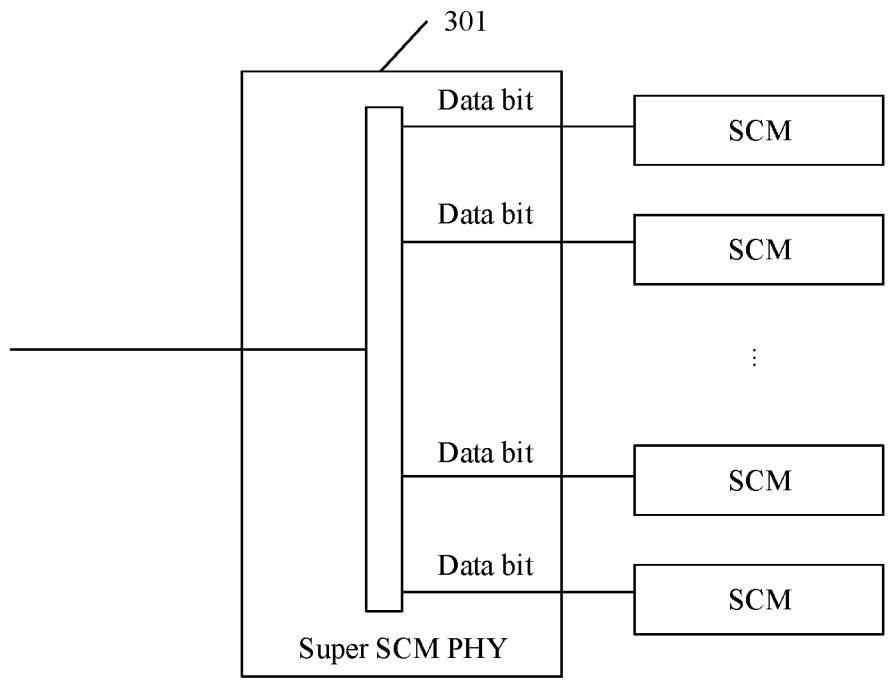
FIG. 4 is a schematic diagram of an example of a management unit 301 according to an embodiment of this application.

In one implementation, one data transmission channel corresponds to data bits used for data transmission in the first storage media, and the management unit 301 may be a component configured to combine data bits in the at least two first storage media. FIG. 4 is a schematic diagram of an example of the management unit 301. In FIG. 4, if the first storage media are the SCMs at the layer 2 shown in FIG. 1 and the second storage medium is the DRAM at the layer 1 shown in FIG. 1, the management unit 301 may be a super SCM port physical layer (super SCM port physical layer, super SCM PHY), and uses data bits in at least two SCMs as one virtual data transmission channel, for example, uses data bits in eight SCMs as one virtual data transmission channel. The virtual data transmission channel is controlled by a DQ strobe (DQS) in the super SCM PHY. In this way, the virtual data transmission channel may synchronously transmit data in a plurality of SCMs. Compared with a single SCM, transmission performance of the virtual data transmission channel is improved. For example, a transmission bandwidth of the single SCM is 800 MB/s, and if the virtual data transmission channel includes data bits in eight SCMs, a transmission bandwidth of the virtual data transmission channel is 800×8=6400 MB/s, thereby improving a rate of data migration between the SCM and the DRAM, and reducing a data migration delay.

For example, transmission performance of the virtual data transmission channel matches the transmission performance of the second storage medium. The transmission performance of the second storage medium may be a throughput, a data processing capability, a transmission bit width, a transmission bandwidth, or the like of the second storage medium. That transmission performance of the data transmission channel matches the transmission performance of the second storage medium means that the transmission performance of the data transmission channel matches the transmission performance of the second storage medium, and does not become a bottleneck of the transmission performance of the second storage medium. In this way, a data amount of data sent by the virtual data transmission channel matches a unit data amount that can be processed by the second storage medium. Therefore, after receiving data through the virtual data transmission channel, the second storage medium may directly process the data, thereby further reducing a data migration delay.

In embodiments of this application, transmission performance may be represented by a transmission bit width or a transmission bandwidth. In this case, the management unit 301 may determine a quantity N of first storage media based on a first ratio of a transmission bit width of the second storage medium to a transmission bit width of the first storage medium or based on a second ratio of a transmission bandwidth of the second storage medium to a transmission bandwidth of the first storage medium. N is an integer not less than 2. Then, the management unit 301 establishes data transmission channels between the N first storage media and the second storage medium based on the quantity N of first storage media.

For example, the first storage medium is an SCM, and the second storage medium is a DDR4. If the management unit 301 determines that a transmission bit width of the SCM is 8 bits (bit) and that a transmission bit width of the DDR4 is 64 bits, a ratio of the transmission bit width of the DDR4 to the transmission bit width of the SCM is 8. Therefore, the management unit 301 determines to establish data transmission channels between eight SCMs and one DDR4. For another example, the first storage medium is an SCM, and the second storage medium is a DDR5. If the management unit 301 determines that a transmission bandwidth of the SCM is 800 MB/s and that a transmission bandwidth of the DDR5 is 3200 MB/s, a ratio of the transmission bandwidth of the DDR5 to the transmission bandwidth of the SCM is 4. Therefore, the management unit 301 determines to establish data transmission channels between four SCMs and one DDR5.

It should be noted that, if another parameter is used to indicate transmission performance of different storage media, the management unit 301 may determine a value of N in another manner. This is not limited herein.

Figure 5:
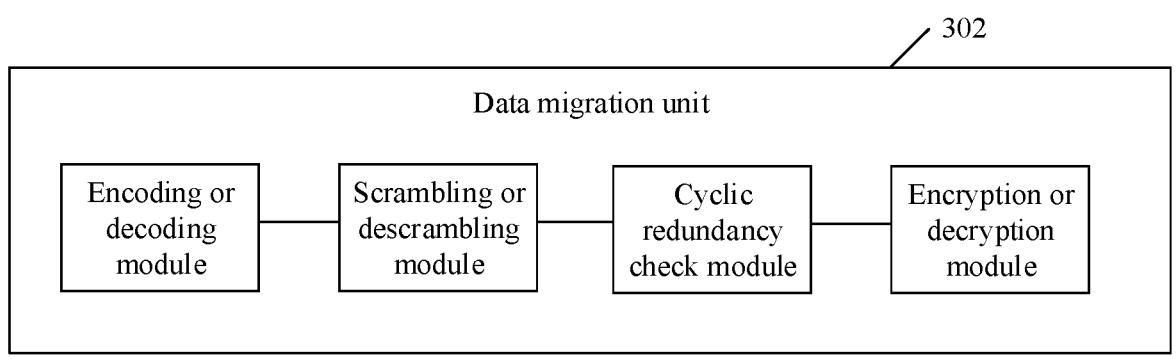
FIG. 5 is a schematic diagram of an example of a data migration unit 302 according to an embodiment of this application.

FIG. 5 is a schematic diagram of an example of the data migration unit 302 according to an embodiment of this application. As shown in FIG. 5, the data migration unit 302 may include a plurality of modules such as an encoding or decoding module, a scrambling or descrambling module, a cyclic redundancy check (cyclic redundancy check, CRC) module, and an encryption or decryption module. The data migration unit 302 performs encoding or decoding processing, scrambling or descrambling processing, cyclic redundancy check (cyclic redundancy check, CRC) processing, encryption processing, and the like on data in a managed data transmission channel, to ensure reliability of migrated data in the managed data transmission channel. Certainly, the data migration unit 302 may alternatively be an independent chip, and the independent chip may be configured to implement functions of the foregoing plurality of modules. A specific implementation of the data migration unit 302 is not limited herein.

In embodiments of this application, there may be one or more data migration units 302. Specifically, the management unit 301 may create virtual data transmission channels between the first storage media and the second storage medium based on a quantity of first storage media and that of second storage media.

Figure 6:
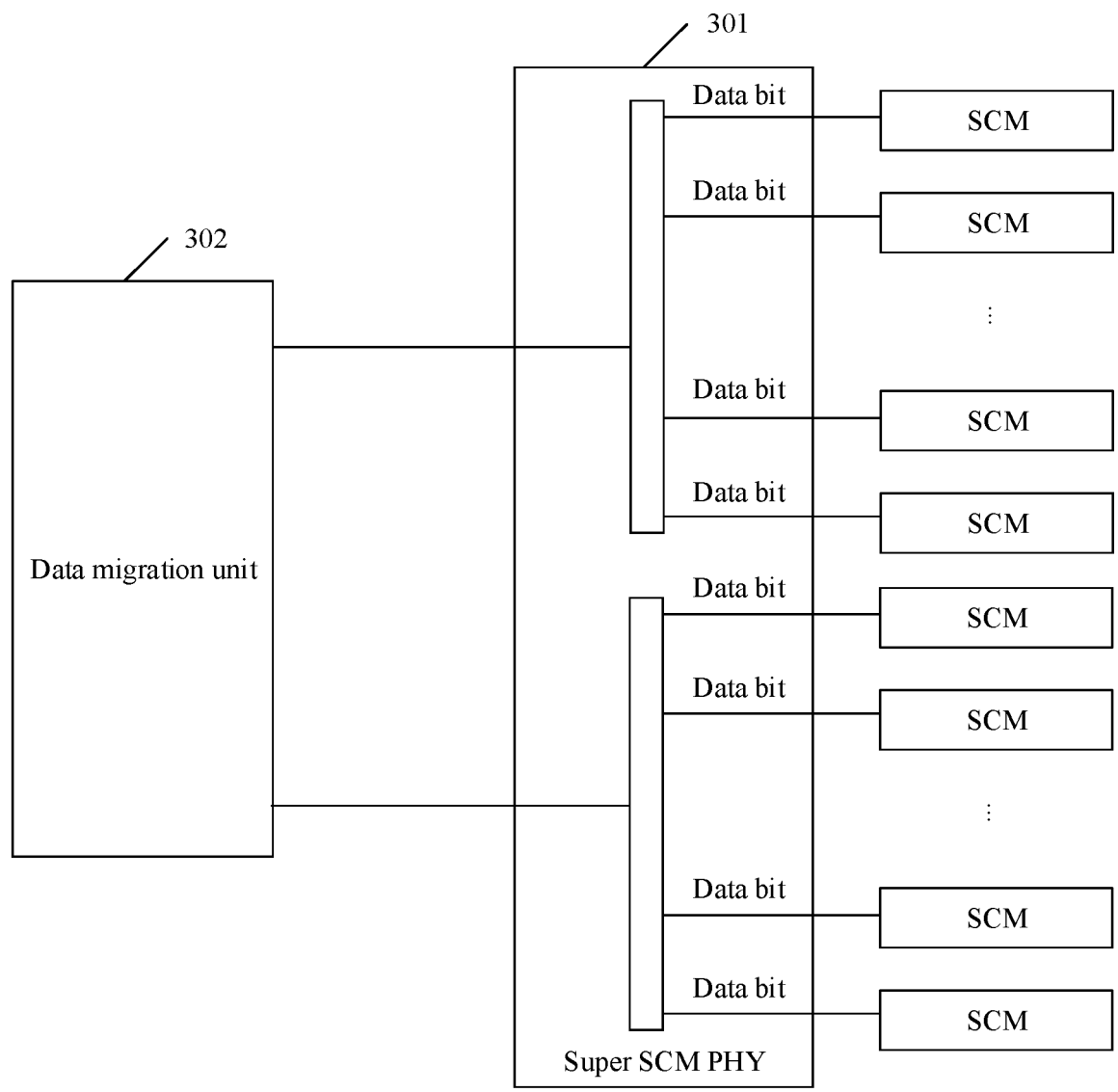
FIG. 6 is a schematic diagram of an example of a quantity of data migration units 302 according to an embodiment of this application.

For example, the management unit 301 is configured to manage data transmission channels between eight first storage media and one second storage medium. For example, the management unit 301 creates one virtual data transmission channel between every four first storage media and the second storage medium. In other words, the management unit 301 creates two virtual data transmission channels in total. Each virtual data transmission channel includes data transmission channels between the four first storage media and the second storage medium. In this case, for example, there may be one data migration unit 302. As shown in FIG. 6, the data migration unit 302 is separately connected to two virtual data transmission channels, and is configured to migrate data between the plurality of first storage media and the second storage medium through the two virtual data transmission channels.

Figure 7:
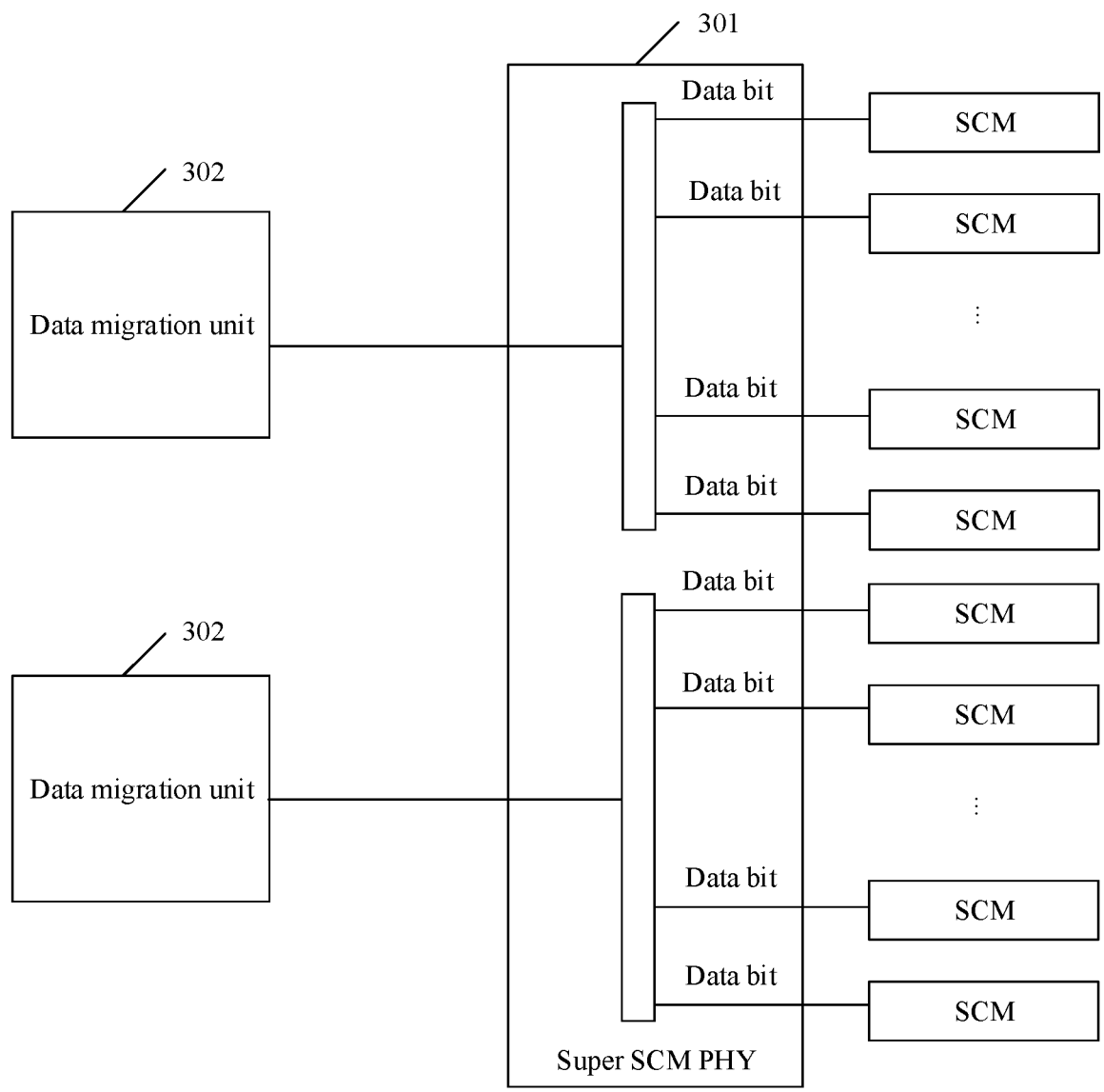
FIG. 7 is a schematic diagram of another example of a quantity of data migration units 302 according to an embodiment of this application.

For another example, there may be a plurality of data migration units 302. Specifically, a quantity of data migration units 302 may be the same as a quantity of virtual data transmission channels. As shown in FIG. 7, the management unit 301 creates two virtual data transmission channels between the first storage media and the second storage medium. Therefore, the quantity of data migration units 302 is also 2, and each data migration unit 302 is connected to one virtual data transmission channel to perform data migration. In this case, a plurality of mutually independent data migration units 302 each perform data migration, so that data congestion between a plurality of virtual data transmission channels can be avoided, and quality of service (quality of service, QoS) of the data management apparatus can be improved.

Further, to help a CPU in a system read data in the first storage medium and the second storage medium, the data management apparatus in embodiments of this application may further include a data processing unit 303, configured to: receive a data read instruction, and read target data from the second storage medium according to the data read instruction.

Figure 8:
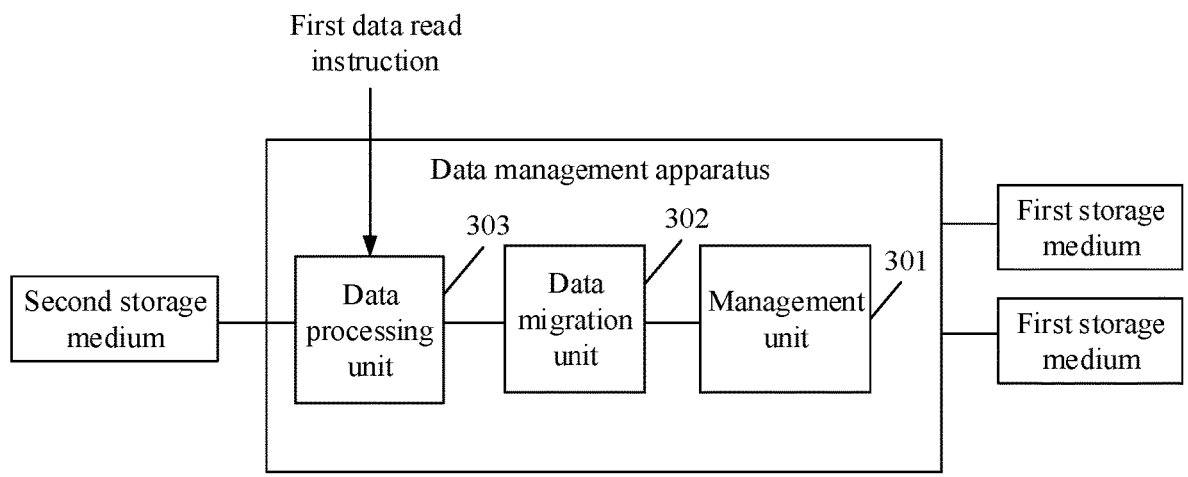
FIG. 8 is a block diagram of a structure of another example of a data management apparatus according to an embodiment of this application.

For example, refer to FIG. 8. The data processing unit 303 is separately connected to the second storage medium and the data migration unit 302. After receiving the data read instruction, the data processing unit 303 first reads the target data from the second storage medium. If the target data does not exist in the second storage medium, the data processing unit 303 sends a migration instruction to the data migration unit 302. The data migration unit 302 migrates the target data from the at least two first storage media to the second storage medium according to the migration instruction. Alternatively, after receiving the data read instruction, the data processing unit 303 first determines whether the target data is stored in the first storage medium or the second storage medium. For example, a storage capacity of the first storage medium is greater than a storage capacity of the second storage medium. Therefore, a data amount of data stored in the first storage medium is greater than a data amount of data stored in the second storage medium. Therefore, if a data amount of the target data is greater than a threshold, it is determined that the target data is stored in the first storage medium, or otherwise, it is determined that the target data is stored in the second storage medium. If the target data is stored in the first storage medium, the data migration unit 302 migrates the target data from the first storage medium to the second storage medium. If the target data is stored in the second storage medium, the data processing unit 303 directly reads the target data from the second storage medium.

It can be learned from the foregoing process that, regardless of a storage medium in which the target data that needs to be read by the data processing unit 303 according to the data read instruction is stored, the data processing unit 303 can obtain the target data. Therefore, the data processing unit 303 only needs to present a unified data read interface, and reads, through the unified data read interface, data stored in the first storage medium and the second storage medium. In this way, the controllers (that is, the SCM controller and the memory controller) for two types of storage media in the system shown in FIG. 2 may be collectively referred to as the data management apparatus in embodiments of this application, so that performance requirements of the controllers for the storage media in the system can be reduced, and a parallel structure between different storage media shown in FIG. 2 can be changed to a series structure in embodiments of this application, thereby simplifying a system architecture. In addition, because the CPU may read data from the two types of storage media or write data into the storage media through the unified data read interface, that is, the CPU may access the two types of storage media through only one protocol (including memory semantics, input/output (input and output, IO) semantics, and the like), a data access process of the CPU can be simplified.

Further, in addition to reading data from the first storage medium and the second storage medium, the CPU may further need to write data into the first storage medium or the second storage medium. In this case, in embodiments of this application, the data management apparatus may further include a data processing unit 304, configured to: receive a first data write instruction, and write first data into the at least two first storage media according to the first data write instruction. The data processing unit 304 is further configured to: receive a second data write instruction, and write second data into the second storage medium according to the second data write instruction.

Figure 9:
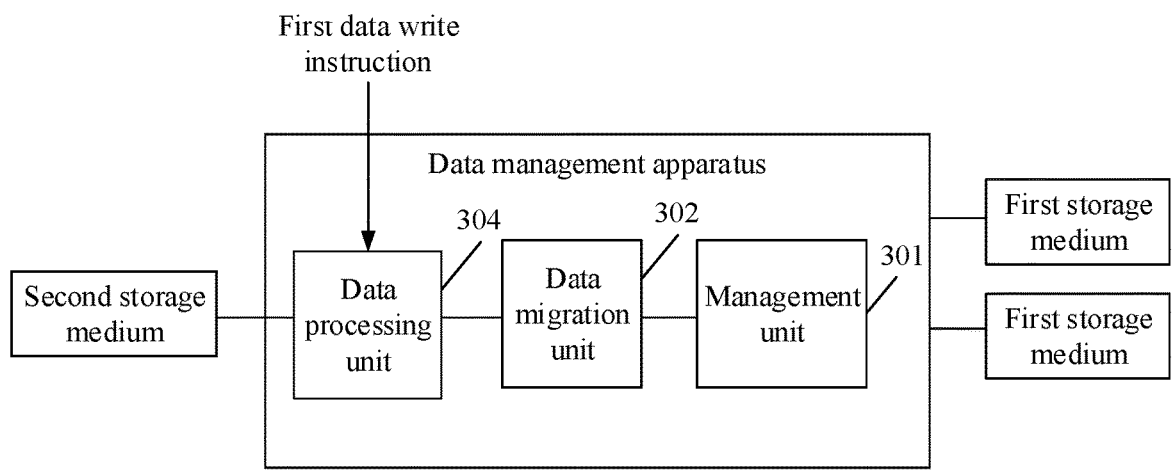
FIG. 9 is a block diagram of a structure of another example of a data management apparatus according to an embodiment of this application.

For example, refer to FIG. 9. The data processing unit 304 is separately connected to the second storage medium and the data migration unit 302. After receiving the first data write instruction, the data processing unit 304 may directly write the first data carried in the first data write instruction into the at least two first storage media through the data migration unit 302. Alternatively, the data processing unit 304 may determine, according to a preset policy, whether to write the first data into the first storage medium or the second storage medium. The preset policy may be: determining a data amount of the first data, and if the data amount of the first data is less than a threshold, determining to write the first data into the second storage medium, or otherwise, writing the first data into the first storage medium. Alternatively, the first data write instruction indicates a storage location of the first data. For example, if the first data is stored in the at least two first storage media, the data processing unit 304 writes the first data into the at least two first storage media. A manner of processing the second data write instruction by the data processing unit 304 is similar to the manner of processing the first data write instruction. Details are not described herein again.

It can be learned from the foregoing process that the data processing unit 304 can separately write data into the first storage medium and the second storage medium according to a data write instruction. Therefore, similar to the data processing unit 303, the data processing unit 304 also only needs to present a unified data write interface, and separately write data into the first storage medium and the second storage medium through the unified data write interface. In other words, the CPU may use only one protocol to write data into the two types of storage media. In the foregoing process, a same protocol is used for the first data write instruction and the second data write instruction that are received by the data processing unit 304, so that a data write process of the CPU can be simplified.

It should be noted that the data processing unit 303 and the data processing unit 304 may be two data processing units independent of each other. The data processing unit 303 is a data processing unit for reading data, and the data processing unit 304 is a data processing unit for writing data. Alternatively, the data processing unit 303 and the data processing unit 304 may be integrated into a same data processing unit. The data processing unit implements a function of the data processing unit 303 through data read program code and a data read interface, and implements a function of the data processing unit 304 through data write program code and a data write interface. In this case, the data processing unit 303 and the data processing unit 304 may be configured to receive a data read instruction and a data write instruction of the CPU, and can further communicate with the data migration unit 302, to read data from the at least two first storage media or write data into the at least two first storage media.

Figure 10:
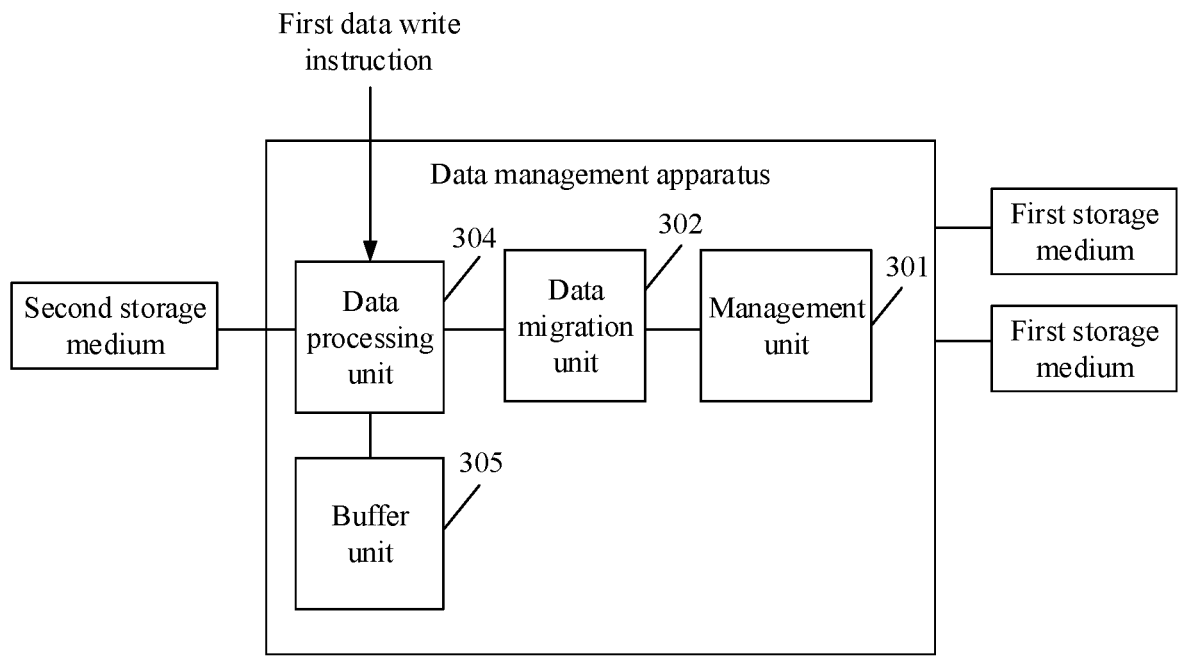
FIG. 10 is a block diagram of a structure of another example of a data management apparatus according to an embodiment of this application.

In addition, considering that the transmission performance of the first storage medium is poorer than the transmission performance of the second storage medium, when data is written into the at least two first storage media, in a unit time, a data amount of data sent to the at least two first storage media is greater than a data amount of the data written into the at least two first storage media. Therefore, to ensure that all the data can be written into the at least two first storage media, a buffer unit 305 may be further disposed in the data management apparatus. For example, FIG. 10 is a block diagram of a structure of another example of a data management apparatus. In FIG. 10, the buffer unit 305 is connected to the data processing unit 304, and is configured to receive and buffer data in the data processing unit 304. When the data processing unit 304 determines to write data into the at least two first storage media, the data processing unit 304 first sends the data to the buffer unit 305, and then reads the data from the buffer unit 305 in batches and writes the read data into the at least two first storage media, until all the data in the buffer unit 305 is written into the at least two first storage media.

Figure 11:
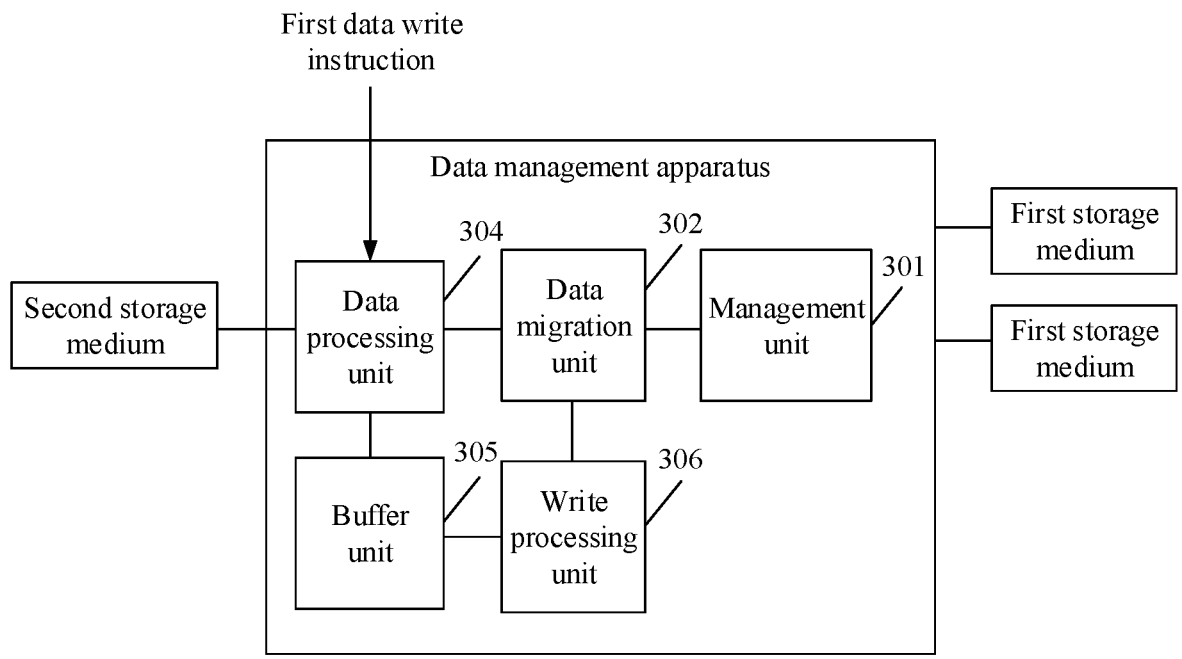
FIG. 11 is a block diagram of a structure of another example of a data management apparatus according to an embodiment of this application.

Further, to reduce load of the data processing unit 304, the data management apparatus in embodiments of this application may further include a write processing unit 306. For example, refer to FIG. 11. The write processing unit 306 is separately connected to the buffer unit 305 and the data migration unit 302 shown in FIG. 10, and is configured to: read data from the buffer unit 305, and write the read data into the at least two first storage media through the data migration unit 302. In this case, after receiving a first data write instruction, the data processing unit 304 only needs to store data carried in the first data write instruction in the buffer unit 305. Then, after reading the data from the buffer unit 305, the write processing unit 306 writes the data into the at least two first storage media. This can reduce the load of the data processing unit 304.

In a possible implementation, if the first storage medium is the SCM shown in FIG. 2, the write processing unit 306 is configured to write data into at least two first storage media.

It can be learned from the data management apparatus shown in FIG. 8 to FIG. 11 that the data management apparatus may directly communicate with the CPU, to read data from the first storage medium and the second storage medium or write data into the first storage medium or the second storage medium. Therefore, from this perspective, the data management apparatus may be replaced with the memory controller and the SCM controller shown in FIG. 2, to obtain a system of a new structure that includes the data management apparatus and the CPU. In the system of the new structure, storage media at different layers are connected in series as shown in FIG. 8 to FIG. 11 instead of being connected in parallel as shown in FIG. 2. This can further simplify a design of controllers for storage media at different layers.

Figure 12:
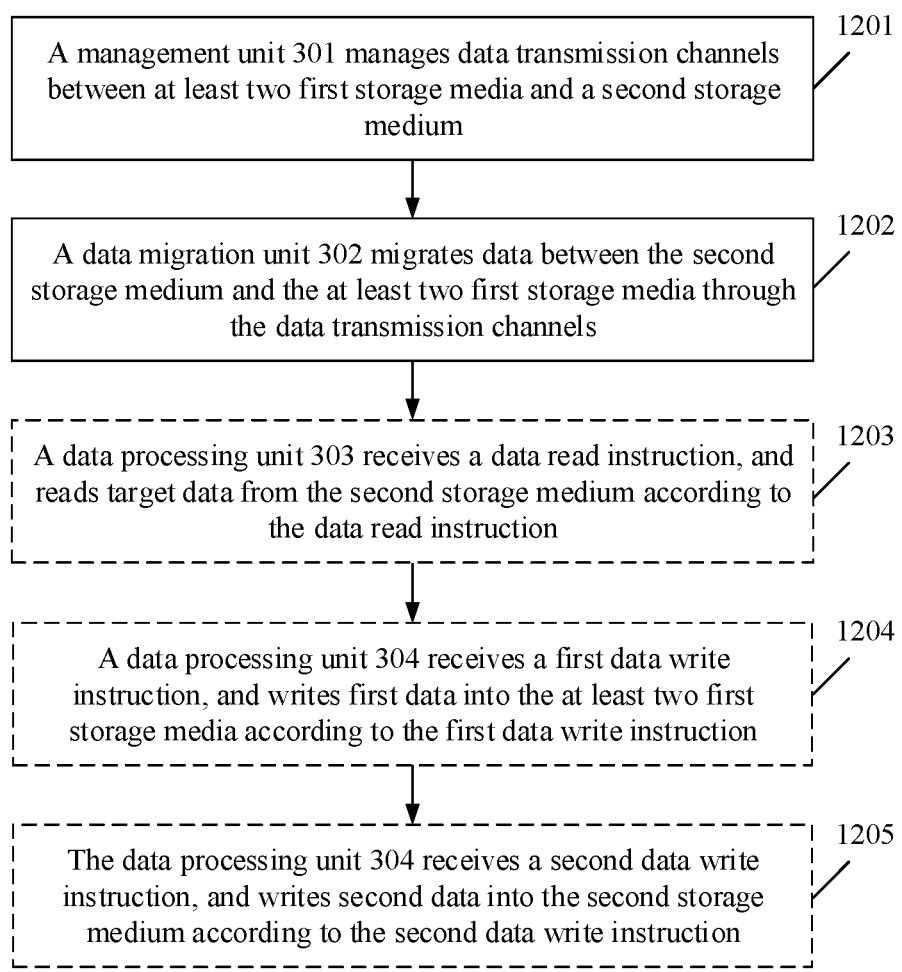
FIG. 12 is a flowchart of an example of a data management method according to an embodiment of this application.

Based on a same inventive concept, an embodiment of this application provides a data management method. The method is applied to the data management apparatus shown in any one of FIG. 3 to FIG. 11. FIG. 12 is a flowchart of an example of the method. The flowchart is described as follows:

S1201: A management unit 301 manages data transmission channels between at least two first storage media and a second storage medium.

A relationship between transmission performance of the first storage medium and transmission performance of the second storage medium is described in the foregoing content. Details are not described herein again. The management unit 301 manages a data transmission channel between each first storage medium and the second storage medium.

Specifically, the management unit 301 may randomly create virtual data transmission channels between a plurality of first storage media and the second storage medium. Alternatively, the management unit 301 may determine a quantity N of first storage media based on a first ratio of a transmission bit width of the second storage medium to a transmission bit width of the first storage medium or based on a second ratio of a transmission bandwidth of the second storage medium to a transmission bandwidth of the first storage medium, and then establish data transmission channels between the N first storage media and the second storage medium based on the quantity N of first storage media. For a specific process, refer to the foregoing description of the management unit 301. Details are not described herein again.

Certainly, the management unit 301 may establish the managed data transmission channel between the first storage medium and the second storage medium in another manner. This is not limited in this embodiment of this application.

S1202: A data migration unit 302 migrates data between the second storage medium and the at least two first storage media through the data transmission channels.

In a possible implementation, if the data management apparatus further includes a data processing unit 303, the method may further include step S1203:

S1203: The data processing unit 303 receives a data read instruction, and reads target data from the second storage medium according to the data read instruction.

Specifically, after receiving the read data instruction, the data processing unit 303 may determine a storage location of the target data. If the target data is stored in the second storage medium, the data processing unit 303 directly reads the target data from the second storage medium. If the target data is stored in the at least two first storage media, the data processing unit 303 migrates the target data from the at least two first storage media to the second storage medium through the data migration unit 302, and then reads the target data from the second storage medium. For a specific process, refer to the foregoing description of the data processing unit 303. Details are not described herein again.

In a possible implementation, if the data management apparatus further includes a data processing unit 304, the method may further include step S1204:

S1204: The data processing unit 304 receives a first data write instruction, and writes first data into the at least two first storage media according to the first data write instruction.

S1205: The data processing unit 304 receives a second data write instruction, and writes second data into the second storage medium according to the second data write instruction.

In this embodiment of this application, a same protocol is used for the first data write instruction and the second data write instruction. For example, the data processing unit 304 receives the first data write instruction. The data processing unit 304 may determine a storage location of the first data according to a preset policy. If the data processing unit 304 determines that the first data is stored in the second storage medium, the data processing unit 304 directly writes the first data into the second storage medium. If the data processing unit 304 determines that the first data is stored in the at least two first storage media, the data processing unit 304 writes the first data into the at least two first storage media through the data migration unit 302. Alternatively, the data processing unit 304 writes the first data into a corresponding storage medium based on a storage location indicated by the first write instruction. For a specific process, refer to the foregoing description of the data processing unit 304. Details are not described herein again.

It should be noted that step S1203 to step S1205 are optional steps, that is, are not necessarily performed. Therefore, step S1203 to step S1205 are represented by dashed lines in FIG. 12.

In the foregoing technical solution, the data management apparatus can directly migrate data between storage media with different transmission performance, and a CPU in a system does not need to perform processing, so that a delay of performing the foregoing processing by the CPU can be shortened. In addition, because the CPU does not need to perform data migration, resource overheads of the CPU can be reduced.

In the foregoing embodiments provided in this application, to implement functions in the method provided in embodiments of this application, a storage system may include a hardware structure and/or a software module, and the functions are implemented by the hardware structure, the software module, or a combination of the hardware structure and the software module. Whether a specific function in the foregoing functions is implemented by the hardware structure, the software module, or the combination of the hardware structure and the software module depends on a particular application and a design constraint condition of the technical solutions.

In the embodiments shown in FIG. 3 to FIG. 11, division into the modules is an example and is merely logical function division, and there may be another division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

Figure 13:
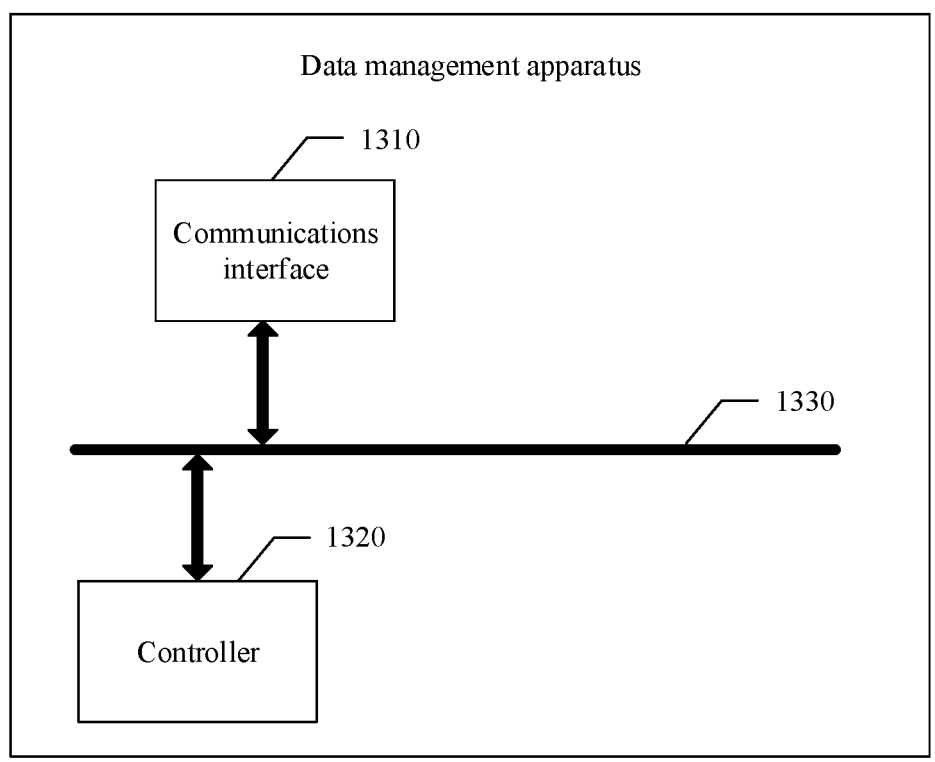
FIG. 13 is a schematic diagram of a structure of another example of a data management apparatus according to an embodiment of this application.

FIG. 13 shows a data management apparatus 1300 according to an embodiment of this application. The data management apparatus 1300 may be a chip system. In embodiments of this application, the chip system may include a chip, or may include a chip and another discrete device.

The data management apparatus 1300 includes at least one controller 1320, configured to implement or support the data management apparatus 1300 to implement the method provided in embodiments of this application. For details, refer to detailed descriptions in the method examples. Details are not described herein again.

The data management apparatus 1300 includes a communications interface 1310, and the communications interface 1310 is configured to communicate with a CPU.

A specific connection medium between the communications interface 1310 and the controller 1320 is not limited in embodiments of this application. In embodiments of this application, the controller 1320 and the communications interface 1310 are connected through a bus 1330 in FIG. 13. The bus may be a bus for communication performed through a data consistency protocol. In FIG. 13, the bus is represented by a bold line. Another manner of connection between the components is merely an example for description, and imposes no limitation. The bus may be classified into an address bus, a data bus, a control bus, and the like. For ease of representation, only one bold line is used to represent the bus in FIG. 13, but this does not mean that there is only one bus or only one type of bus.

In embodiments of this application, the controller 1320 may be a super SCM PHY, a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any conventional processor. The steps of the methods disclosed with reference to embodiments of this application may be directly performed and completed by a hardware processor, or may be performed and completed through a combination of hardware and software modules in the processor.

An embodiment of the present invention further provides a data storage device, including a controller, at least two first storage media, and a second storage medium. The controller separately communicates with the at least two first storage media and the second storage medium. There is one data transmission channel between each first storage medium and the second storage medium. The controller is configured to implement the method described above in embodiments of the present invention. The data storage device may be a memory or the like. This is not limited in the present invention. The controller may be a field programmable gate array (Field Programmable Gate Array, FPGA), an application-specific integrated circuit (Application-specific integrated circuit, ASIC), or the like, or may be a combination thereof. The data storage device further includes a communications interface. For the controller in embodiments of the present invention, refer to the controller 1320 in FIG. 13. Details are not described herein again.

An embodiment of this application further provides a computer-readable storage medium, including instructions. When the instructions are run on a computer, the computer is enabled to perform the data management method in the embodiment shown in FIG. 12 or perform the method performed by the data management apparatus in FIG. 3 to FIG. 11.

An embodiment of this application further provides a computer program product, including instructions. When the computer program product is run on a computer, the computer is enabled to perform the data management method in the embodiment shown in FIG. 12 or perform the method performed by the data management apparatus in FIG. 3 to FIG. 11.

An embodiment of this application provides a chip system. The chip system includes a processor, and may further include a memory, configured to implement a function of the data management apparatus in the foregoing methods. The chip system may include a chip, or may include a chip and another discrete device.

An embodiment of this application provides a storage system. The storage system includes the data management apparatus in the embodiments shown in FIG. 3 to FIG. 11.

All or some of the methods provided in embodiments of this application may be implemented through software, hardware, firmware, or any combination thereof. When the software is used for implementation, all or some of the methods may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

What is claimed is:

1. A data management method, comprising:
managing, by a data management apparatus of a hierarchical storage system, data transmission channels between at least two first storage media and a second storage medium, wherein the at least two first storage media and the second storage medium are coupled to different layers in a hierarchical storage system, wherein transmission performance of each first storage medium is poorer than transmission performance of the second storage medium, and there is a data transmission channel between each first storage medium and the second storage medium, wherein the data management apparatus is independent from a central processing unit (CPU) of the hierarchical storage system; and
migrating, by the data management apparatus, data between the second storage medium and the at least two first storage media through the data transmission channels,
wherein the at least two first storage media are of a first type, the second storage medium is of a second type.

2. The method according to claim 1, wherein transmission performance of the data transmission channels matches the transmission performance of the second storage medium.

3. The method according to claim 1, wherein the managing data transmission channels between at least two first storage media and a second storage medium comprises:
determining a quantity N of first storage media based on one of a first ratio of a transmission bit width of the second storage medium to a transmission bit width of the first storage medium or a second ratio of a transmission bandwidth of the second storage medium to a transmission bandwidth of the first storage medium, wherein N is an integer not less than 2; and
establishing data transmission channels between the N first storage media and the second storage medium based on the quantity N of first storage media.

4. The method according to claim 1, wherein the method further comprises:
receiving a data read instruction, and reading target data from the second storage medium according to the data read instruction.

5. The method according to claim 4, wherein the method further comprises:
migrating the target data from the at least two first storage media to the second storage medium.

6. The method according to claim 1, wherein the method further comprises:

receiving a first data write instruction, and writing first data into the at least two first storage media according to the first data write instruction.

7. The method according to claim 6, wherein the method further comprises:
receiving a second data write instruction, and writing second data into the second storage medium according to the second data write instruction.

8. The method according to claim 7, wherein a same protocol is used for the first data write instruction and the second data write instruction.

9. A data storage device, comprising:
a controller;
at least two first storage media; and
a second storage medium,
wherein the at least two first storage media and the second storage medium are coupled to different layers in a hierarchical storage system, and the controller is independent from a central processing unit (CPU) of the hierarchical storage system,
wherein the controller separately communicates with the at least two first storage media and the second storage medium, there is one data transmission channel between each first storage medium and the second storage medium, and the controller is configured to:
manage data transmission channels between the at least two first storage media and the second storage medium, wherein transmission performance of each first storage medium is poorer than transmission performance of the second storage medium; and
migrate data between the second storage medium and the at least two first storage media through the data transmission channels,
wherein the at least two first storage media are of a first type, the second storage medium is of a second type.

10. The data storage device according to claim 9, wherein transmission performance of the data transmission channels matches the transmission performance of the second storage medium.

11. The data storage device according to claim 9, wherein the controller is further configured to: determine a quantity N of first storage media based on a first ratio of a transmission bit width of the second storage medium to a transmission bit width of the first storage medium or based on a second ratio of a transmission bandwidth of the second storage medium to a transmission bandwidth of the first storage medium, wherein N is an integer not less than 2; and
establish data transmission channels between the N first storage media and the second storage medium based on the quantity N of first storage media.

12. The data storage device according to according to claim 9, wherein the controller is further configured to: receive a data read instruction, and read target data from the second storage medium according to the data read instruction.

13. The data storage device according to claim 12, wherein the controller is further configured to migrate the target data from the at least two first storage media to the second storage medium.

14. The data storage device according to according to claim 9, wherein the controller is further configured to: receive a first data write instruction, and write first data into the at least two first storage media according to the first data write instruction.

15. The data storage device according to claim 14, wherein the controller is further configured to: receive a second data write instruction, and write second data into the second storage medium according to the second data write instruction.

16. The data storage device according to claim 15, wherein a same protocol is used for the first data write instruction and the second data write instruction.

17. A non-transitory memory, wherein the non-transitory memory stores instructions, and when the instructions are run on a computer, the computer is enabled to perform the method:
managing, by a data management apparatus of a hierarchical storage system, data transmission channels between at least two first storage media and a second storage medium, wherein the at least two first storage media and the second storage medium are coupled to different layers in a hierarchical storage system, wherein transmission performance of each first storage medium is poorer than transmission performance of the second storage medium, and there is a data transmission channel between each first storage medium and the second storage medium, wherein the data management apparatus is independent from a central processing unit (CPU) of the hierarchical storage system; and
migrating, by the data management apparatus, data between the second storage medium and the at least two first storage media through the data transmission channels,
wherein the at least two first storage media are of a first type, the second storage medium is of a second type.

18. The non-transitory memory according to claim 17, wherein transmission performance of the data transmission channels matches the transmission performance of the second storage medium.

19. The non-transitory memory according to claim 17, wherein the managing data transmission channels between at least two first storage media and a second storage medium comprises:
determining a quantity N of first storage media based on one of a first ratio of a transmission bit width of the second storage medium to a transmission bit width of the first storage medium or a second ratio of a transmission bandwidth of the second storage medium to a transmission bandwidth of the first storage medium, wherein N is an integer not less than 2; and
establishing data transmission channels between the N first storage media and the second storage medium based on the quantity N of first storage media.

20. The non-transitory memory according to claim 17, wherein the computer is further enabled to perform:
receiving a data read instruction, and reading target data from the second storage medium according to the data read instruction.

* * * * *